(12) United States Patent
Wendt et al.

(10) Patent No.: US 12,338,907 B2
(45) Date of Patent: Jun. 24, 2025

(54) VALVE CARTRIDGE

(71) Applicant: FLÜHS DREHTECHNIK GMBH, Lüdenscheid (DE)

(72) Inventors: Jörg Wendt, Lüdenscheid (DE); Lutz Lange, Lüdenscheid (DE); Tim-Florian Klawin, Halver (DE)

(73) Assignee: FLÜHS DREHTECHNIK GMBH, Lüdenscheid (DE)

( * ) Notice: Subject to any disclaimer, the term of this patent is extended or adjusted under 35 U.S.C. 154(b) by 8 days.

(21) Appl. No.: 18/267,514

(22) PCT Filed: Mar. 18, 2022

(86) PCT No.: PCT/EP2022/057171
§ 371 (c)(1),
(2) Date: Jun. 15, 2023

(87) PCT Pub. No.: WO2022/238033
PCT Pub. Date: Nov. 17, 2022

(65) Prior Publication Data
US 2024/0035576 A1    Feb. 1, 2024

(30) Foreign Application Priority Data

May 12, 2021 (EP) .................................. 21173531

(51) Int. Cl.
| *F16K 31/53* | (2006.01) |
| *F16K 3/08*  | (2006.01) |
| *F16K 25/00* | (2006.01) |
| *F16K 27/04* | (2006.01) |

(52) U.S. Cl.
CPC .............. *F16K 3/085* (2013.01); *F16K 25/00* (2013.01); *F16K 31/53* (2013.01)

(58) Field of Classification Search
CPC ........ F16K 3/085; F16K 31/53; F16K 27/045; F16K 2200/501
See application file for complete search history.

(56) References Cited

U.S. PATENT DOCUMENTS

| 4,899,982 A | 2/1990 | Lange |
| 5,025,832 A | 6/1991 | Taylor |
| 6,481,459 B2 | 11/2002 | Fukano et al. |
| 2009/0108220 A1* | 4/2009 | Staev ...................... F16K 31/04 251/129.12 |

(Continued)

FOREIGN PATENT DOCUMENTS

| CN | 206530723 U | 9/2017 |
| DE | 83 07 769 U1 | 9/1983 |
| DE | 32 07 895 C2 | 12/1983 |

(Continued)

OTHER PUBLICATIONS

International Search Report in PCT/EP2022/057171, mailed May 24, 2022.

*Primary Examiner* — Paul J Gray
(74) *Attorney, Agent, or Firm* — Collard & Roe, P.C.

(57) ABSTRACT

A valve cartridge includes a top part that is penetrated in the center by a spindle which is rotatably and axially slidably mounted in the top part and which includes an axial through-hole to allow water to flow therethrough; the spindle actuates a valve, by which the flow rate of the water through the through-hole can be controlled.

17 Claims, 4 Drawing Sheets

(56) References Cited

U.S. PATENT DOCUMENTS

2019/0001350 A1   1/2019   Huang et al.

FOREIGN PATENT DOCUMENTS

| DE | 87 15 044 U1 | 1/1988 |
| DE | 36 38 180 C2 | 5/1988 |
| DE | 101 30 955 A1 | 1/2002 |
| DE | 20 2018 100 921 U1 | 5/2019 |

* cited by examiner

VALVE CARTRIDGE

CROSS REFERENCE TO RELATED APPLICATIONS

This application is the National Stage of PCT/EP2022/057171 filed on Mar. 18, 2022, which claims priority under 35 U.S.C. § 119 of European Application No. 21173531.1 filed on May 12, 2021, the disclosure of which is incorporated by reference. The international application under PCT article 21(2) was not published in English.

The invention relates to a valve cartridge, having a headpiece penetrated at its center by a spindle, which is held turnably and axially displaceably in the headpiece and which has an axial bore for passage of water, wherein a valve for controlling the rate of flow through the bore can be actuated by the spindle.

The release of media from fittings is controlled by means of valve upper parts. For this purpose, the valve upper part is screwed by means of its headpiece into the housing. The spindle is connected to a lever, via which it can be turned. In known valve upper parts (see DE 32 07 895 C2, DE 36 38 180 C2, DE 87 15 044 U1), respectively two disks are provided for control of the flow rate. The disks are made of ceramic material. By means of a driving feature connected with the spindle, one of the two disks—control disk—is disposed turnably in the valve upper part. The other disk—inlet disk—is a fixed valve-seat disk, also referred to as a fixed disk. During turning of the control disk, the disks slide against one another.

The water flow rate can be controlled with straight way valve fittings. A straight way valve having a housing, which is provided with a water supply port and a water discharge port, is described in DE 101 30 955 A1. A valve tappet, which can be moved into the water passage region via an actuating device, whereby the water flow rate can be controlled, is disposed perpendicular to the water passage region. A further straight way valve is described in DE 83 07 769 U1. In that case the valve body is formed by a turnable disk-shaped control element, which is mounted in the water passage region and is disposed such that it can be moved turnably relative to two fixed disks.

The already known straight way valves have the disadvantage that they are complex in construction and require a considerable installation space.

Here is where the invention intends to create a remedy. The task underlying the invention is to provide a valve cartridge that permits a configuration of a straight way valve fitting requiring minimized installation space. According to the invention, this task is accomplished by a valve cartridge having the features of claim 1.

With the invention, a valve cartridge is provided that permits a configuration of a straight way valve fitting requiring minimized installation space. By the fact that the spindle has an axial bore for the passage of water and is held turnably and axially displaceably in the headpiece, a very compact configuration of the valve cartridge can be achieved, since the headpiece in particular does not have any multiple shoulders for axial fixation of the spindle, whereby the outside diameter of the headpiece is minimized. At the same time, the diameter of the bore for the passage of water may be maximized. The axial fixation of the spindle may take place in the course of integration into the straight way valve fitting by a stop provided here.

In a further development of the invention, the spindle is provided outside the headpiece with a coupling portion having non-round, preferably polygonal cross section. Hereby a coupling of minimized installation space is achieved with one operating part inside a straight way valve fitting.

In one configuration of the invention, the headpiece has an integrated valve seat, on which the valve comes to bear. Hereby a compact valve arrangement is possible. Preferably, the valve is formed by a control disk and an inlet disk bearing on this and held secured against being turned in the headpiece. In this case, a seal, which preferably is constructed as a lip seal, is advantageously disposed between the inlet disk and the valve seat.

In a further configuration of the invention, the headpiece is provided on the inside with a portion that has an inside diameter narrowing conically in the direction of the spindle and that forms the valve seat. Hereby a targeted guidance of the water flow toward the passage region of the passage disk is achieved, thus permitting a very compact integration of a valve seat at the same time.

In a further development of the invention, the spindle has, at its end, at least one driving pin, via which it is connected interlockingly with the control disk. Hereby a compact connection, secured against being turned, is achieved between spindle and control disk.

In one configuration of the invention, the headpiece has at least one positioning nose at its end facing the spindle. Hereby a simple, positionally correct mounting of the valve cartridge is permitted by engagement of the at least one positioning nose in a positioning recess located in a fitting. Alternatively or additionally, at least one positioning nose may also be disposed on the end of the headpiece facing away from the spindle.

The task underlying the invention is further to provide a straight way valve fitting having a configuration of minimized installation space. According to the invention, this task is accomplished by a fitting having the features of claim 9. By the fact that a cartridge of the foregoing type is introduced into the fitting, wherein the spindle bears with its free end on a stop disposed in the fitting, whereby it is fixed axially, a very compact construction of the fitting housing is possible. In this case, the spindle is able to bear directly or indirectly on the stop, for example via a sealing or sliding disk.

Preferably, an actuating part is disposed in a manner connected interlockingly with the coupling portion. This actuating part may be formed by a pivotable lever or a motor drive.

In a further development of the invention, the motor drive is formed by an electric motor, which is connected via a bevel gear mechanism with the coupling portion. Hereby a compact linkage of the electric motor to the spindle is possible. For this purpose, the motor may be disposed perpendicular to the spindle. Advantageously, the bevel gear of the bevel gear mechanism is constructed annularly and has an inside contour that corresponds to the outside contour of the coupling portion onto which it is pushed.

In one configuration of the invention, the bevel gear is formed by an annular part, on which a bevel gear segment is integrally formed, or in other words is disposed in one piece. Hereby a compact structure is achieved. The tapered projection of the bevel gear is extended only as far around the annular part as is necessary for the maximum turning of the spindle. Preferably, the tapered projection of the bevel gear segment spans an angle of between 100° and 130° of the annular part.

A further configuration of the invention is provided with a water supply port and a water discharge port, which are aligned with one another and between which the valve cartridge is disposed. Hereby a compact structure of the fitting is achieved.

Other configurations and further developments of the invention are indicated in the other dependent claims. An exemplary embodiment of the invention is illustrated in the drawing and will be described in detail in the following, wherein:

Figure 1:
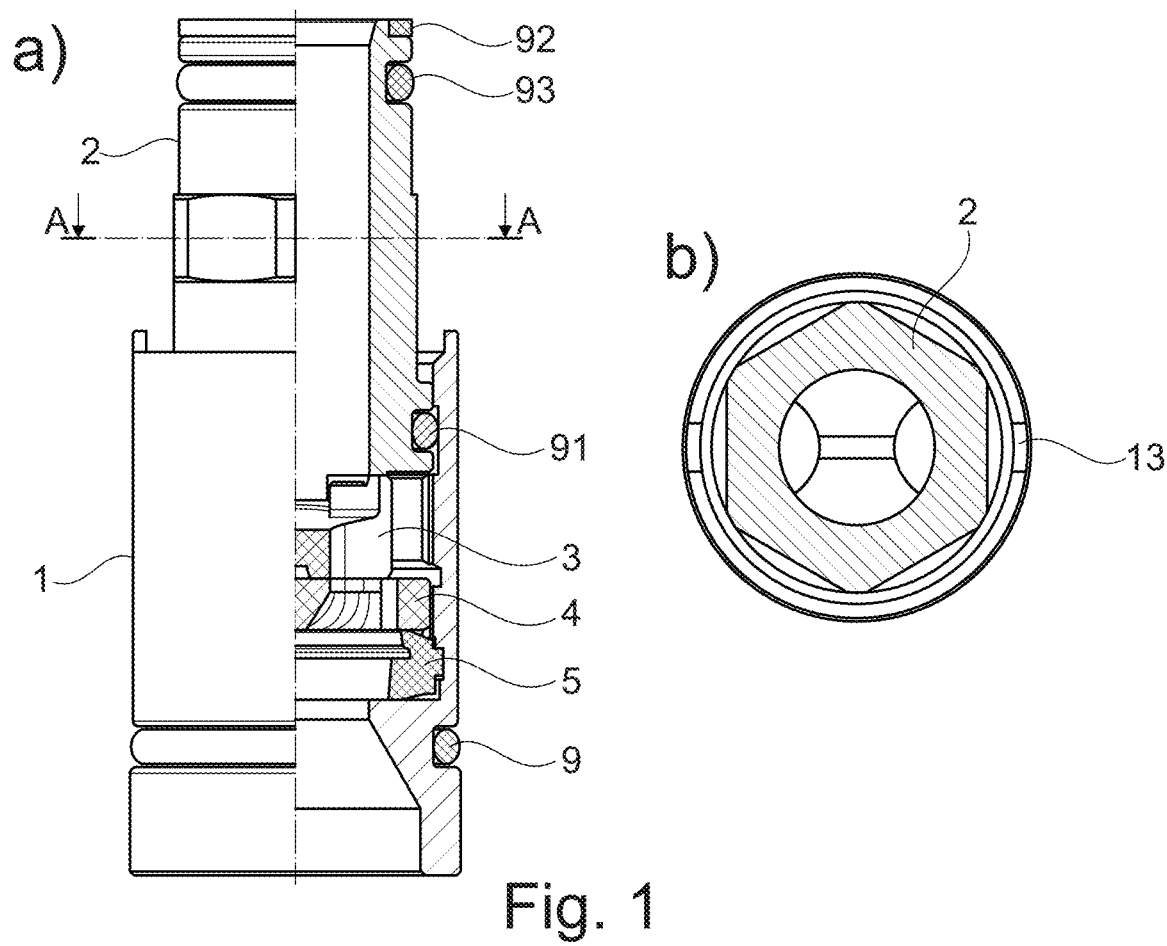
FIG. 1 shows the schematic diagram of a valve cartridge
 a) partly in elevation, partly in the axial section;
 b) in the plan view
Figure 2:
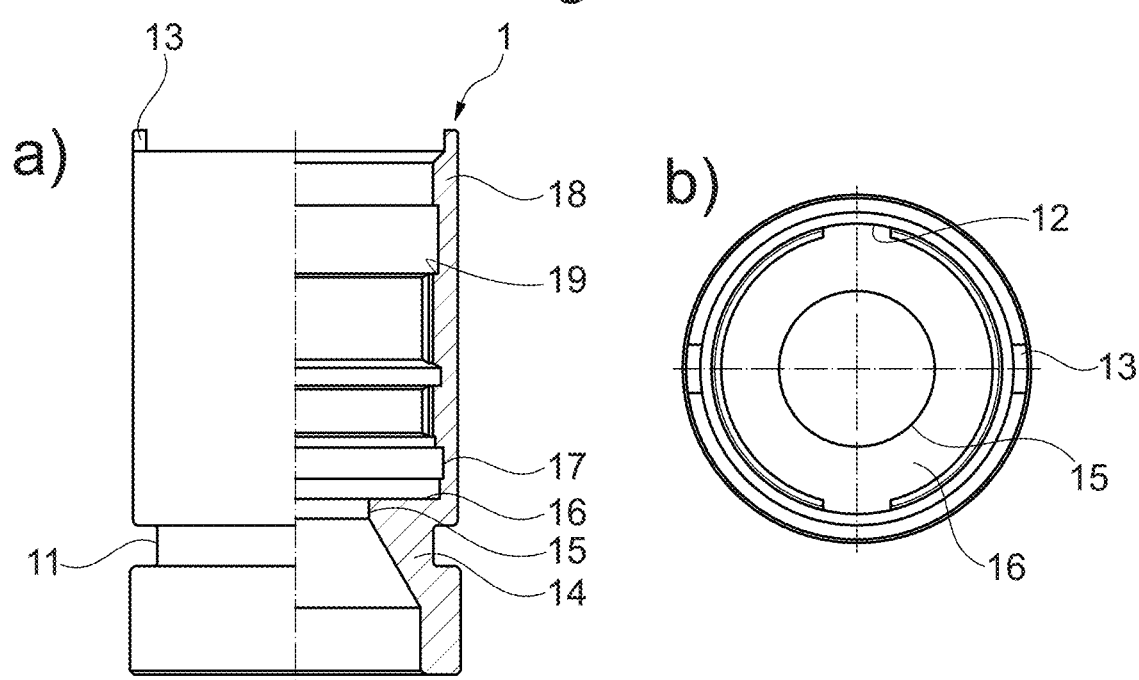
FIG. 2 shows the diagram of the headpiece of the valve cartridge from FIG. 1
 a) partly in elevation, partly in the axial section;
 b) in the plan view.
Figure 3:
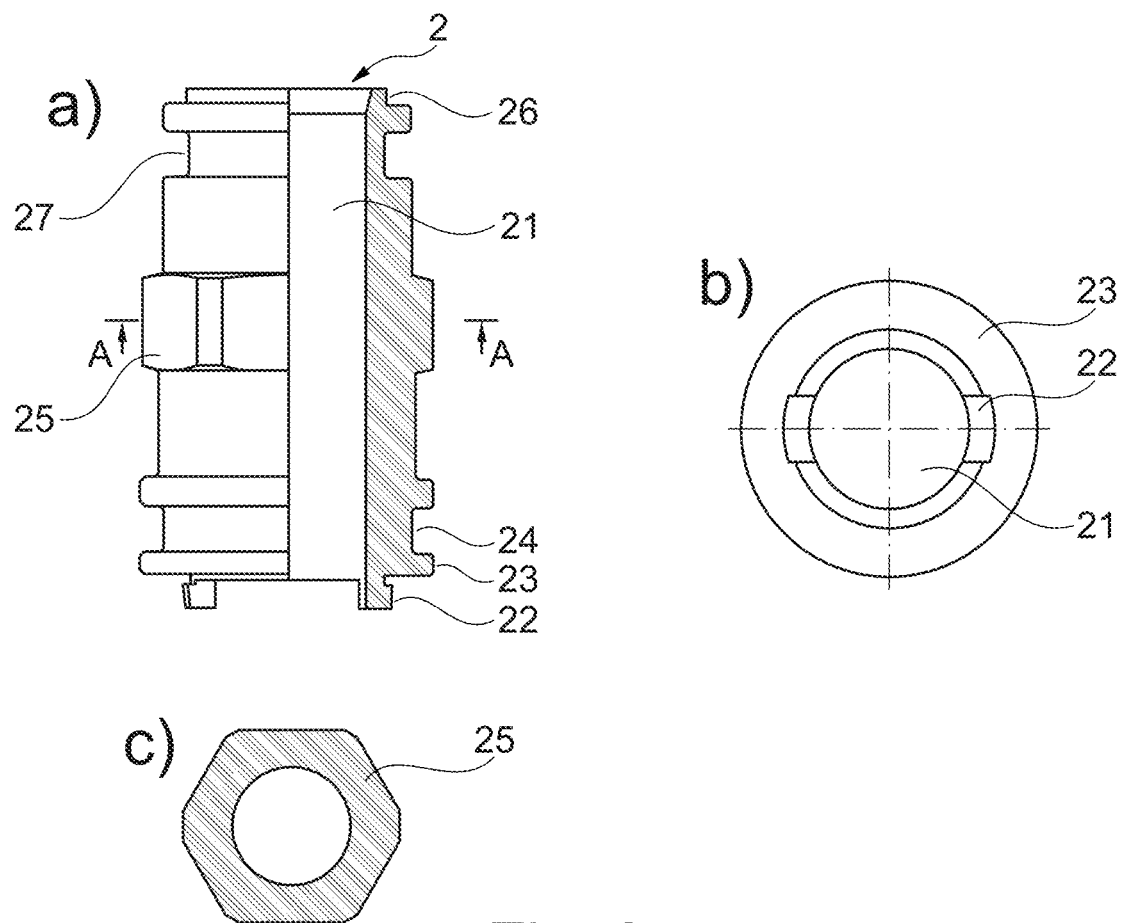
FIG. 3 shows the diagram of the spindle of the valve cartridge from FIG. 1
 a) partly in elevation, partly in the axial section;
 b) in the view from underneath;
 c) in section through A-A.
Figure 4:
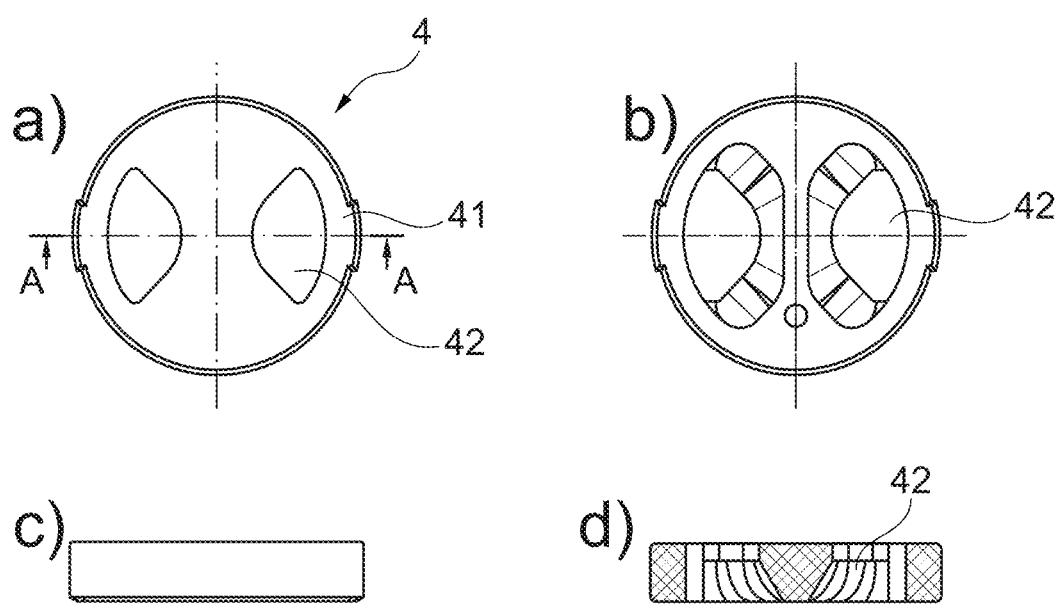
FIG. 4 shows the diagram of the inlet disk of the valve cartridge from FIG. 1
 a) in the plan view;
 b) in the view from underneath;
 c) in the side view;
 d) in the section A-B.
Figure 5:
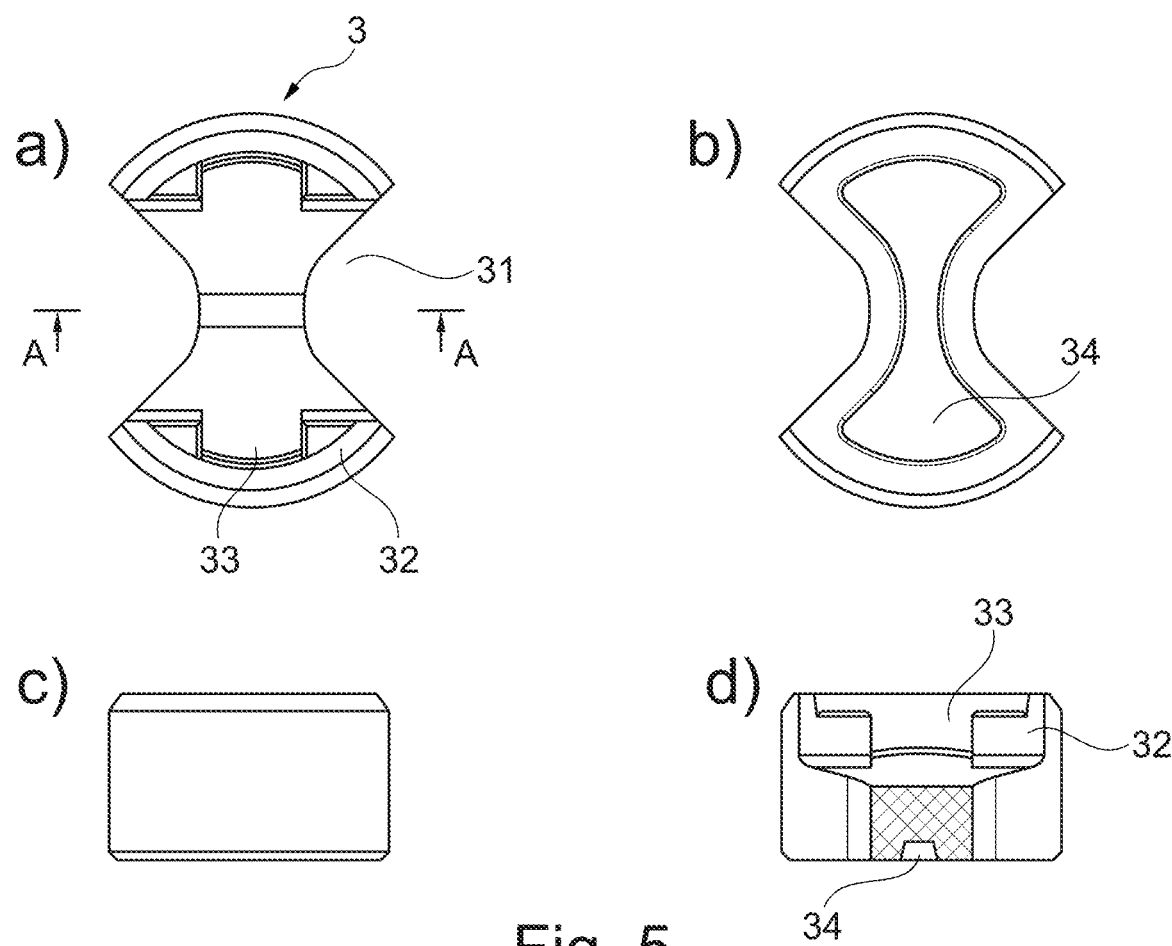
FIG. 5 shows the diagram of the control disk of the valve cartridge from FIG. 1
 a) in the plan view;
 b) in the view from underneath;
 c) in the side view;
 d) in the section A-A.
Figure 6:
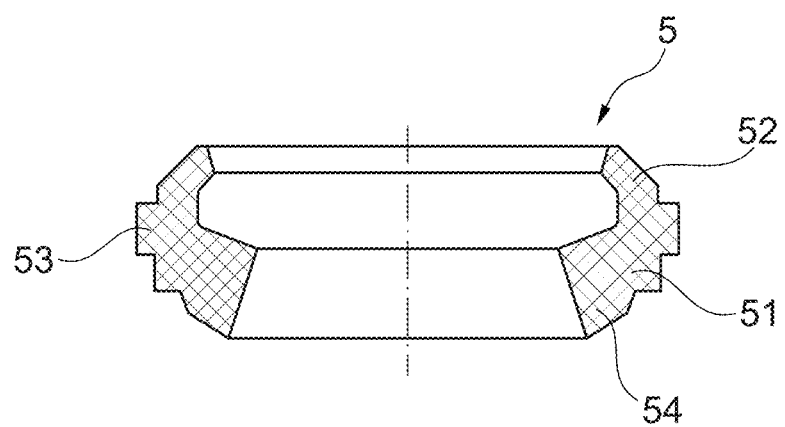
FIG. 6 shows the diagram of the lip seal of the valve cartridge from FIG. 1

The valve cartridge chosen as exemplary embodiment has a headpiece 1 penetrated at its center by a spindle 2 guided radially in it. Via spindle 2, a valve can be actuated that comes into contact with a valve seat 16 disposed in the headpiece 1. In the exemplary embodiment, the valve is formed by a control disk 3 and an inlet disk 4. The control disk 3 is connected interlockingly with the spindle 2 and guided radially in the headpiece 1. On its side of the control disk 3 facing away from the spindle 2, the inlet disk 4 is disposed in the headpiece 1 and is adjoined by a lip seal 5, which comes into contact with the valve seat 16 of the headpiece 1. The control disk 3 bears sealingly on the inlet disk 4. In the exemplary embodiment, the control disk 3 and the inlet disk 4 are constructed as ceramic disks.

In the exemplary embodiment, the headpiece 1 is constructed as a brass turning part and consists of a cylindrical hollow body, in the outer shell surface of which a groove 11 for accommodation of an O-ring 9 is machined. On its end side opposite the groove 11, two positioning noses 13 are disposed in diametrically opposite manner. A reduced-diameter portion 14, with inside diameter narrowing conically in the direction of the positioning noses and merging into a cylindrical bushing 15, is disposed at the height of the groove 11, on the inside. The reduced-diameter portion 14 has an annular face, which forms the valve seat 16. Spaced apart from the valve seat 16, a groove 17 for accommodation of the lip seal 5 is machined into the inside shell surface of the headpiece. On its side facing the positioning noses 13, the headpiece 1 is further provided on the inside with an annular groove 18, by which a shoulder 19 is formed for support of the collar 23 of the spindle 2 in the course of integration into a straight way valve fitting. Beyond that, two axial grooves 12, extending from the shoulder 19 to the groove 17, are disposed in diametrically opposite manner on the inside. The axial grooves 12 accommodate the noses 41 of the inlet disk 4, whereby this is held secured against being turned in the headpiece 1.

The spindle 2 is constructed as a substantially cylindrical brass turning part and is provided at its center with an axial bore 21 for the passage of water. At the ends, two driving pins 22 for interlocking connection with the control disk 3 are disposed in diametrically opposite manner on the spindle. A circumferential collar 23, in which a seal groove 24 for accommodation of an O-ring 91 is machined, adjoins the driving pins 22. Via the O-ring 91, the spindle 2 is sealed relative to the headpiece 1. Spaced apart from the collar 23, a coupling portion 25, which is constructed in the shape of an irregular hexagon, is integrally formed circumferentially on the outside shell surface of the spindle 2. On its end side opposite the driving pins 22, a circumferential annular land 26 is disposed that accommodates a sliding disk 92. A seal groove 27 for accommodation of a further O-ring 93 is machined in the spindle, spaced apart from the annular land 26. The spindle 2 is disposed turnably but axially displaceably in the headpiece 1. The control disk 3 has a substantially barrel-shaped structure, from which oppositely disposed circle sectors 31 have been removed. In the exemplary embodiment, the circle sectors 31 have an angle of approximately 90°. On its side facing the spindle 2, the control disk 3 has an annular cog 32. In the mounted condition, the annular cog 32 wraps around the driving pin 22 of the spindle 2. Recesses 33, in which respectively one driving pin 22 fits, are formed on the foot of the cog 32. On its end side facing away from the spindle 2, a hollow 34 is machined into the control disk 3.

The inlet disk 4 is constructed substantially cylindrically and on its circumference has two noses 41 disposed in diametrically opposite manner. With the noses 41, the inlet disk 4 fits into the axial grooves 12, which for this purpose are disposed on the inside in headpiece 1, whereby the inlet disk 4 is held secured against being turned in the headpiece 1. The inlet disk 4 bears on the lip 52 of the lip seal 5 and has sector-shaped passage openings 42. Two diametrically opposite passage openings 42 are disposed in the exemplary embodiment.

In the exemplary embodiment, the lip seal 5 is formed from rubber and surrounds an annular piece 41, on which a lip 52 is molded onto its end side facing the inlet disk 4. The lip 52 has a substantially trapezoidal structure in cross section. The lip 52 is disposed at an angle to the horizontal. The outside face of the lip 52 bears sealingly on the inlet disk 4. The annular piece 51 is provided on the outside with a collar 53, which engages in the groove 17 of the headpiece 1. On the inside, a welt 54 is formed on the middle piece 51. The outside of the welt 54 lies flat on the valve seat 16 of the reduced-diameter portion 14.

Figure 7:
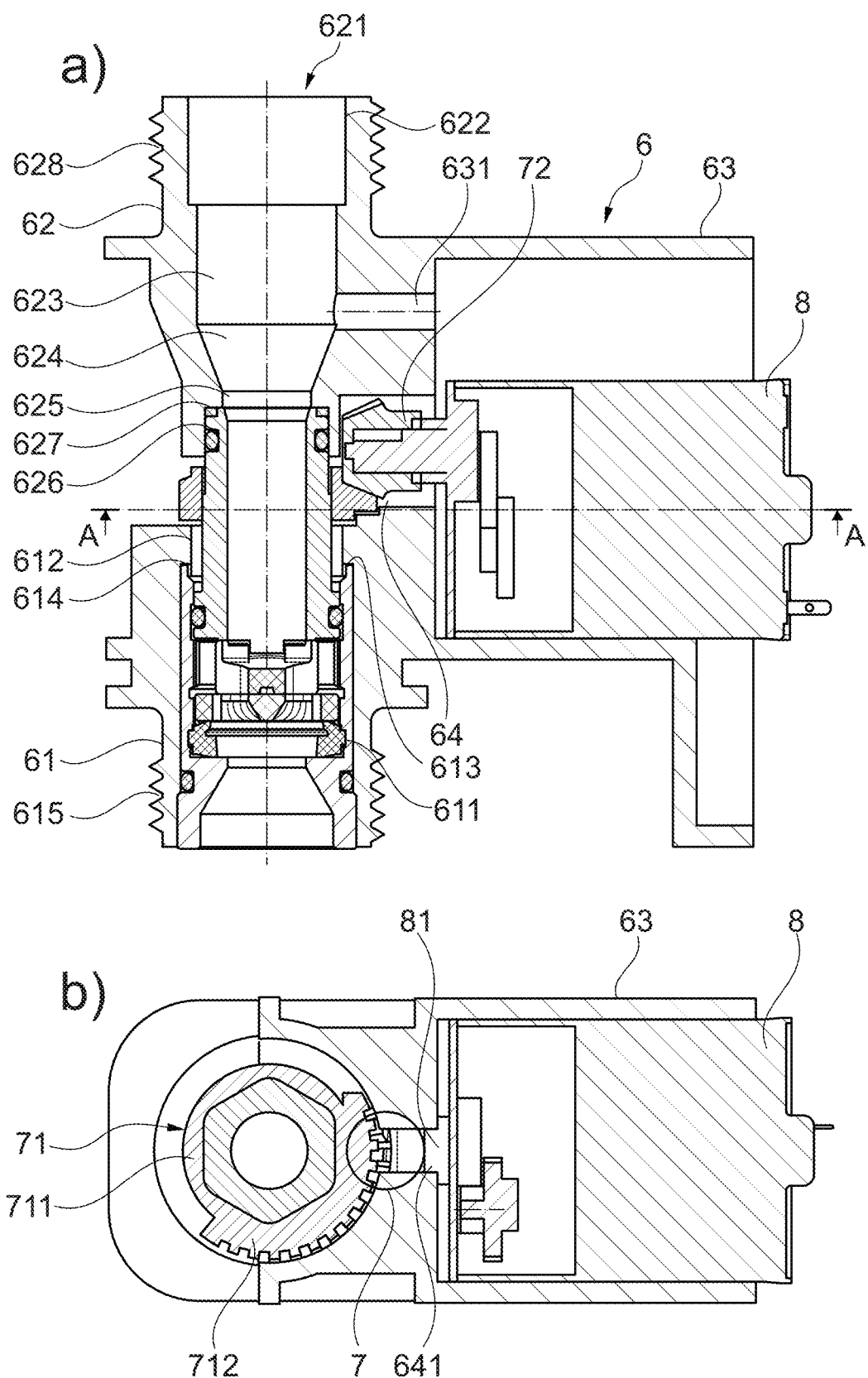
FIG. 7 shows the schematic diagram of a straight way valve fitting
 a) in the longitudinal section;
 d) in the section A-A.

In FIG. 7, a fitting housing 6 is illustrated with a water-passage channel, in which a valve cartridge according to the invention is inserted. The fitting housing 6 comprises a water supply portion 61 and a water outlet or discharge portion 62, through which the water-passage channel is guided, as well as a drive portion 63.

The water supply portion 61 has a cylindrical cartridge holder 611, which is bounded by a portion 612 having reduced inside diameter and forming a stop 613. Two positioning recesses 614 are machined in diametrically opposite manner in the stop 613. At the end, the water supply portion 61 has a male thread 615 for attachment of a water supply line.

The water outlet portion 62 comprises a stepped bore 621, which has a first cylindrical portion 622, adjoined by a second cylindrical portion 623, which has reduced inside diameter and merges into a conically tapering portion 624, which opens into a third cylindrical portion 625, which is adjoined by a fourth cylindrical position 626 of expanded diameter forming an annular contact face 627. At the end, the water discharge portion 62 has on the outside a male thread 628 for attachment of a water discharge line.

The drive portion 63 is constructed substantially cylindrically and opens into a gear mechanism chamber 64, which has a passage 641 that opens into the region between the water supply portion 61 and the water outlet portion 62. Furthermore, a measuring bore 631 that opens into the second portion 623 of the stepped bore 621 is disposed in the drive portion 63.

The valve cartridge is introduced into the cartridge holder 611, wherein the headpiece 1 bears on the stop 613. In the process, the two positioning noses 13 of the headpiece 1 engage in the positioning recesses 614, whereby a positionally correct installation is ensured. The headpiece is sealed via the O-ring 9 relative to the cartridge holder 611. The spindle 2 of the valve cartridge projects through the portion 612 of reduced inside diameter. A bevel gear 71 of a bevel gear drive 7 is mounted on the coupling portion 25. In the exemplary embodiment, this drive is formed from a hollow cylindrical annular part 711, on which a bevel gear segment 712 is disposed on the outside.

The bevel gear segment 712 spans an angle of 110° around the annular part 711. Depending on maximum desired angle of turning of the spindle 2, the bevel gear segment 712 may also span a smaller or a larger angle around the annular part 711. The annular part 711 has an inner contour of an irregular hexagon, which corresponds with the outer contour of the coupling portion 25 on which it is disposed. In this way, the bevel gear 71 is connected interlockingly with the spindle, wherein the bevel gear 71 projects with its bevel gear segment 712 into the passage 641.

At the head side, the spindle 2 bears via the sliding disk 92 on the contact face 627 of the water discharge portion 62. Radially, the spindle 2 is sealed relative to the fourth cylindrical portion 626 of the stepped bore 621 via the O-ring 93 disposed in the seal groove 27.

An electric motor 8, the drive shaft 81 of which projects into the mechanism chamber 64, is disposed in the drive portion 63. A bevel pinion 72, which is in engagement with the bevel gear segment 712 of the bevel gear 71, is mounted on the drive shaft 81. For regulation of the water stream flowing through the water discharge portion 62, a control and regulation device, not illustrated, is provided, which is connected with a sensor introduced into the measuring bore 631, preferably a flow and/or temperature sensor, and via which the electric motor 8 can be activated.

The invention claimed is:

1. A valve cartridge, having comprising:
   a valve;
   a headpiece; and
   a spindle centrally penetrating the headpiece and held rotatably and axially displaceably in the headpiece,
   wherein the spindle comprises an axial bore for passage of water,
   wherein the valve can be actuated by the spindle to control the rate of flow of water through the bore, and
   wherein the spindle has a coupling portion with a non-circular cross-section outside the headpiece.

2. The valve cartridge according to claim 1, wherein the headpiece has an integrated valve seat, on which the valve comes to rest.

3. The valve cartridge according to claim 2, wherein the valve comprises a control disk and an inlet disk resting against the control disk, and
   wherein the inlet disk is non-rotatably held in the headpiece.

4. The valve cartridge according to claim 3, wherein a seal is disposed between the inlet disk and the valve seat.

5. The valve cartridge according to claim 2, wherein the headpiece is provided on the inside with a portion that has an inside diameter narrowing conically in the direction of the spindle and that forms the valve seat.

6. The valve cartridge according to claim 3, wherein the spindle has at least one driving pin at an end of the spindle interlockingly connecting the spindle with the control disk.

7. The valve cartridge according to claim 1, wherein the headpiece has at least one positioning nose at an end of the headpiece facing the spindle and/or at an end of the headpiece facing away from the spindle.

8. A fitting comprising:
   a fitting housing;
   a stop disposed in the fitting housing; and
   a water passage channel, into which the valve cartridge according to claim 1 is introduced,
   wherein the spindle comprises a free end bearing on the stop to fix the spindle axially.

9. The fitting according to claim 8, further comprising an actuating part connected interlockingly with the coupling portion.

10. The fitting according to claim 9, wherein the actuating part comprises a pivotable lever or a motor drive.

11. The fitting according to claim 10, wherein the motor drive is formed by an electric motor, which is connected via a bevel drive mechanism with the coupling portion.

12. The fitting according to claim 11, wherein the bevel drive mechanism comprises an annular bevel gear wheel having an inside contour that corresponds to an outside contour of the coupling portion onto which the annular bevel gear wheel is pushed.

13. The fitting according to claim 12, wherein the bevel gear wheel is formed by an annular part, onto which a bevel gear segment is integrally formed.

14. The fitting according to claim 8, wherein a water supply port and a water discharge port are provided that are aligned with one another and between which the valve cartridge is disposed.

15. The valve cartridge according to claim 1, wherein the non-circular cross section is polygonal.

16. The valve cartridge according to claim 4, wherein the seal is a lip seal.

17. The fitting according to claim 13, wherein the bevel gear segment spans an angle of between 100° and 130°.

* * * * *

UNITED STATES PATENT AND TRADEMARK OFFICE
CERTIFICATE OF CORRECTION

PATENT NO. : 12,338,907 B2
APPLICATION NO. : 18/267514
DATED : June 24, 2025
INVENTOR(S) : Jörg Wendt et al.

Page 1 of 1

It is certified that error appears in the above-identified patent and that said Letters Patent is hereby corrected as shown below:

In the Claims

In Claim 1, Line 1 (Column 5, Line 59): after "cartridge" delete ", having"

Signed and Sealed this
Twenty-second Day of July, 2025

Coke Morgan Stewart
*Acting Director of the United States Patent and Trademark Office*